Sept. 11, 1928.
R. V. GRAHAM
1,684,313
MEASURING AND DISPENSING DEVICE
Filed March 8, 1927
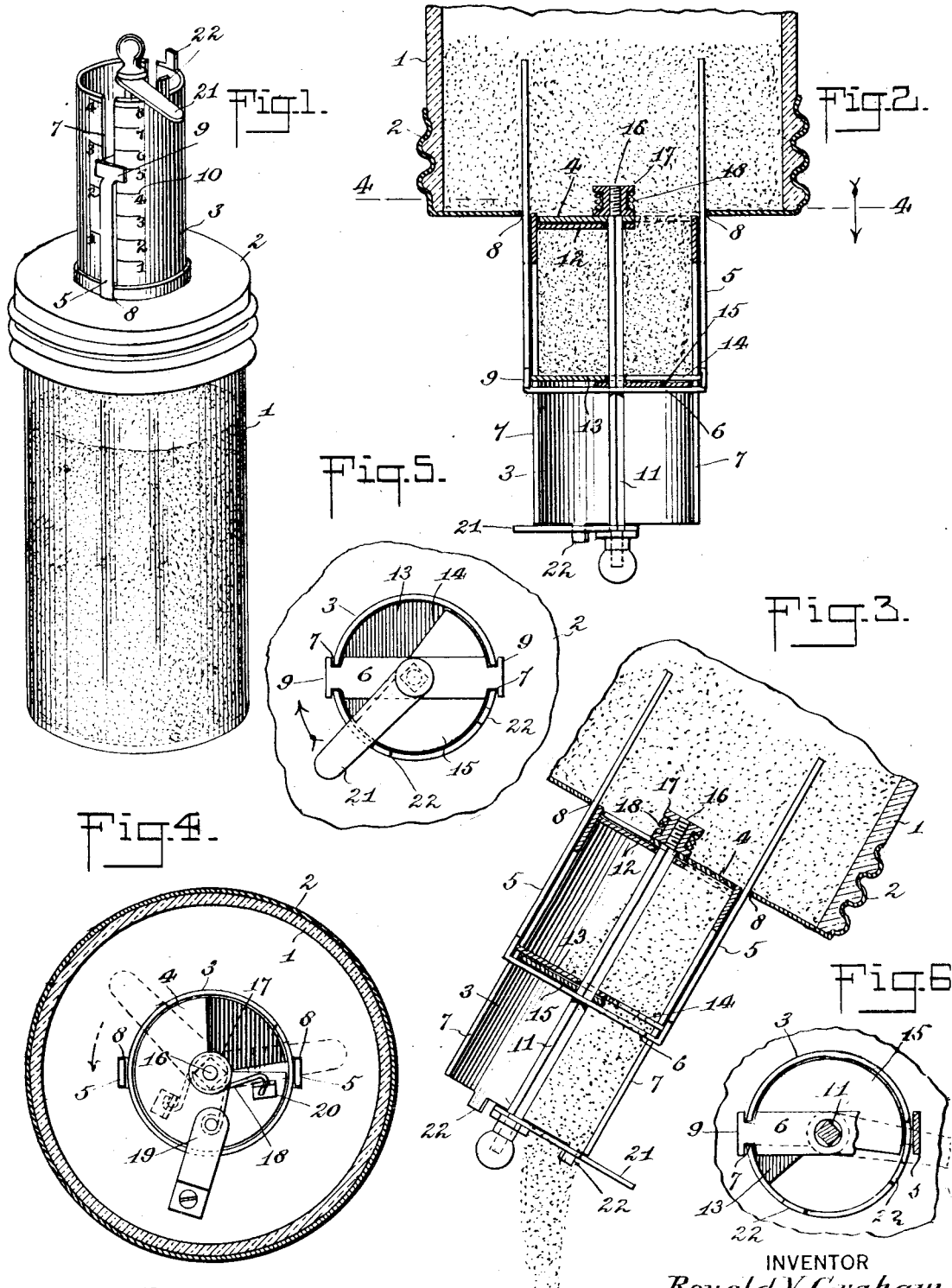
WITNESSES
William P. Goebel.
S. W. Foster
INVENTOR
Ronald V. Graham
BY
ATTORNEY Patented Sept. 11, 1928.

1,684,313

UNITED STATES PATENT OFFICE.

RONALD V. GRAHAM, OF YONKERS, NEW YORK.

MEASURING AND DISPENSING DEVICE.

Application filed March 8, 1927. Serial No. 173,698.

This invention relates to measuring and dispensing devices.

An object of the invention is to provide such a device which is adapted for use in connection with a receptacle containing sugar and the like, which may be used on the table, and which will permit the operator to dispense a teaspoonful or any other measure of sugar desired.

Various receptacles containing sugar are in common use but it is difficult for the ordinary person to determine the exact quantity. My invention is designed for table use, or for any other use for that matter which will enable the operator to secure just the quantity of sugar desired.

I shall hereinafter describe my invention in connection with the dispensing of sugar as this is the primary object, but of course it is to be distinctly understood that the device may be used in connection with various granular materials and may have many other uses besides that of table use.

With these and other objects in view, the invention consists in certain novel features of construction and combinations and arrangements of parts, which will be more fully hereinafter described and pointed out in the claims.

In the accompanying drawings—

Figure 1 is a perspective view illustrating my improved device in a container;

Figure 2 is a view in longitudinal section, showing the container inverted;

Figure 3 is a view showing the container at an angle and the measured quantity of material being dispensed;

Figure 4 is a view in section on the line 4—4 of Figure 2;

Figure 5 is an end elevation of the device;

Figure 6 is a view in end elevation of the device with parts broken away and in section to illustrate the position of the shutter.

1 represents a container which may constitute a glass jar, and 2 a support for my improved measuring and dispensing device, and this support 2 may constitute an ordinary screw-threaded closure for the jar 1, but it is of course to be understood that the receptacle 1 and the support 2 may have various shapes and be variously constructed, it being of course desirable that the parts be separable for convenience in filling the receptacle and in cleaning the device as a whole.

The support 2 has a central opening in which a cylindrical casing 3 is secured. The lower end of the casing constitutes a partial closure for the opening in the support 2, and a movable shutter 4 is adapted to close completely the bottom of the casing, as will more fully hereinafter appear.

5 represents a U-shaped frame having a transverse member 6 which slides in longitudinal slots 7 in the side walls of the casing 3, and the two side parallel members which project through openings 8 in the support 2 are located outside of the casing 3.

On this frame 5 and at opposite sides of the casing 3 enlargements or indicators 9 may be located which register with scales 10 on the outside of the casing to indicate, for example, teaspoon and tablespoon measures.

11 represents a shaft, preferably angular in form, extending centrally and longitudinally of the casing 3 and mounted to turn in the bottom 12 of said casing. 13 represents a partition which is of the same general shape as the interior of the casing 3, slides therein and is operatively connected and fixed to the frame 5.

This partition 13 has an opening 14 therein and a shutter 15 on shaft 11, which is adapted to close this opening 14. The shutters 15 and 4 are oppositely disposed so that when one of these shutters is closed the other is open and vice versa.

As a convenient means for assembling the parts, the shaft 11 is screw-threaded at its inner end, as shown at 16, and a nut 17 is screwed onto the shaft against the bottom 12 of casing 3. This nut 17 may have the intermediate portion of a spring 18 coiled thereon with the ends of said spring engaging lugs 19 and 20.

The lug 19 is on the bottom of casing 3 and the lug 20 is on the shutter 4 so that this spring tends to turn the shaft in a direction which will open the shutter 4 and close the shutter 15.

The shaft is manually operated by means of a lever 21 on the outer end of the shaft, secured thereon in any approved manner and movable between a pair of lugs or stops 22 on the end of the casing.

The operation is as follows:

In accordance with the quantity of sugar desired, the operator moves the frame 5 longitudinally of the casing. This movement of the frame causes the partition 13 and shutter 15 to move toward and away from the bottom 12 of the casing. As above stated, the shutter 4 is normally open and the shutter 15 is normally closed; hence, when the receptacle is inverted or inclined the sugar or other material will flow into the space between the bottom 12 and the partition 13 and fill the same, measuring a definite quantity of sugar therein. The operator then swings the lever 21 to cause the shutter 4 to close and the shutter 15 to open, and the measured quantity of material will fall out of the receptacle.

While the drawings indicate the parts in exaggerated shape it is to be understood that the frame 5, or rather the side members of said frame, engage the sides of the casing so as to close the slots in that portion of the casing between the partition 13 and the bottom 12 so as to prevent any escape of sugar or other material through said slots.

Various changes and alterations might be made in the general form of the parts described without departing from my invention and hence I do not limit myself to the precise details set forth but consider myself at liberty to make such changes and alterations as fairly fall within the spirit and scope of the appended claims.

I claim:

1. A device of the character described, including a casing having an opening in its bottom and having longitudinal slots in the side wall thereof, a U-frame having extensions thereon mounted to move in the slots and having longitudinal side members covering the slots, a partition supported by and movable with said frame having an opening therein, a shaft mounted centrally in the casing, shutters on said shaft oppositely disposed and alternately controlling said openings, and means for turning the shaft.

2. A device of the character described, including a casing having an opening in its bottom and having longitudinal slots in the side wall thereof, a U-frame having extensions thereon mounted to move in the slots and having longitudinal side members covering the slots, a partition supported by and movable with said frame having an opening therein, a shaft mounted centrally in the casing, shutters on said shaft oppositely disposed and alternately controlling said openings, a spring normally holding said shutters in one position, and means permitting manual turning of the shaft to move the shutters to another position.

3. A device of the character described, including a casing having an opening in its bottom and having longitudinal slots in the side wall thereof, a U-frame having extensions thereon mounted to move in the slots and having longitudinal side members covering the slots, a partition supported by and movable with said frame having an opening therein, a shaft mounted centrally in the casing, shutters on said shaft oppositely disposed and alternately controlling said openings, a spring normally holding the shutters in one position, a lever on the shaft manually turning the latter to move the shutters to a different position, and stops on the end of the casing limiting the movement of the lever.

RONALD V. GRAHAM.